United States Patent [19]

Yanagishima et al.

[11] 4,031,527
[45] June 21, 1977

[54] ELECTRONIC ALERTING SYSTEM FOR A VEHICLE DRIVER

[75] Inventors: Takayuki Yanagishima; Naohiko Inoue, both of Yokohama, Japan

[73] Assignee: Nissan Motor Co., Ltd., Yokohama, Japan

[22] Filed: July 3, 1975

[21] Appl. No.: 592,983

[30] Foreign Application Priority Data

July 8, 1974    Japan ............................ 49-77315

[52] U.S. Cl. ............................ 340/279; 340/52 F; 180/99
[51] Int. Cl.² .................. G08B 21/00; B60K 28/00; B60T 7/19
[58] Field of Search ............... 340/279, 52 R, 52 F, 340/53, 262; 180/99, 103; 200/61.54

[56] References Cited

UNITED STATES PATENTS

| | | | |
|---|---|---|---|
| 2,575,926 | 11/1951 | Murray | 340/279 X |
| 3,106,981 | 10/1963 | Chakiris | 340/279 X |
| 3,559,205 | 1/1971 | Colby | 340/279 |
| 3,631,446 | 12/1971 | Setser | 340/279 |
| 3,654,599 | 4/1972 | Sepper | 340/279 X |
| 3,678,494 | 7/1972 | Setser | 340/279 |
| 3,778,116 | 12/1973 | Kennedy | 340/279 X |
| 3,877,541 | 4/1975 | Takeuchi et al. | 340/279 X |

*Primary Examiner*—William M. Wannisky
*Attorney, Agent, or Firm*—Depaoli & O'Brien

[57] ABSTRACT

A warning device is energized when speed signals integrated in an integrator exceed a predetermined level. However if a steering wheel and/or an accelerator pedal is operated, the integrator is reset.

3 Claims, 2 Drawing Figures

ELECTRONIC ALERTING SYSTEM FOR A VEHICLE DRIVER

The present invention relates generally to a safety system, and more particularly to an electronic system for alerting a driver when he becomes sleepy or drowsy when operating a motor vehicle.

REVIEW OF THE PRIOR ART

Various electronic alerting systems are known in the art wherein the oscillations of the steering wheel of a motor vehicle are converted into a series of pulses having a frequency which is compared with a predetermined reference value. In this prior art system, if the frequency of oscillations falls below the reference value, a warning system will be energized to alert the driver. However, the frequency of the steering oscillations varies widely in dependence on not only the nature of the driver but also the physical and psychological conditions of the driver. It further varies in dependence on roadway conditions and more or less on the inherent driving characteristics of the vehicle that vary steadily with time. Thus, the prior warning system is subjected to erroneous operation.

SUMMARY OF THE INVENTION

Therefore, it is an object of the present invention to provide an electronic alerting system for a motor vehicle which eliminate the aforementioned shortcomings and drawbacks of the conventional system.

Another object of the invention is to provide an electronic alterting system wherein not only the operation of the steering wheel but also the operation of the accelerator pedal is checked or monitored for detecting the sleepy or drowsy reactions of the driver and thereafter generating a warning signal.

BRIEF DESCRIPTION OF THE DRAWINGS

These and other objects and features of the present invention will be better understood from the following description taken in conjunction with the accompanying drawings, in which.

DESCRIPTION OF THE PREFERRED EMBODIMENTS

Figures 1, 2:
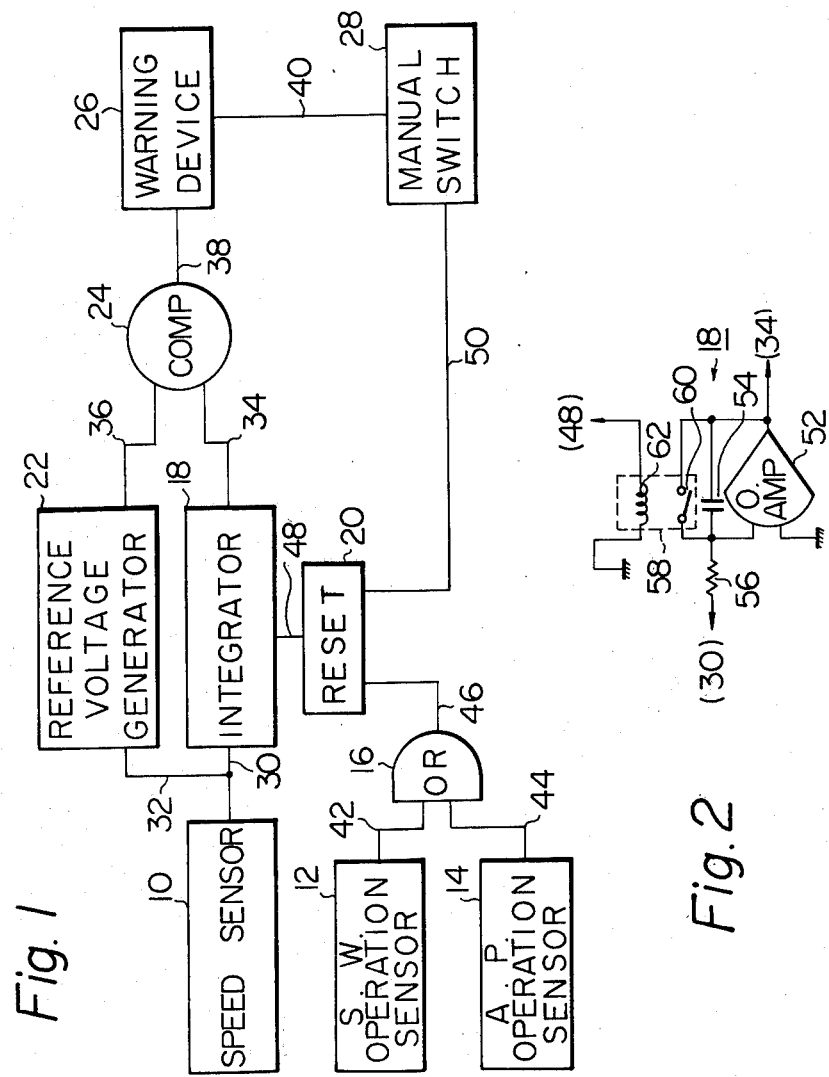
FIG. 1 is a diagrammatic view of an electronic alerting system embodying the present invention.
FIG. 2 is a schematic circuit diagram showing a detailed construction of an integrator shown in FIG. 1.

With reference to the FIG. 1, there is illustrated an electronic driving assurance system for a motor vehicle, which comprises a speed sensor 10, a steering wheel operation sensor 12, an accelerator operation sensor 14, an OR gate 16, an integrator 18, a reset circuit 20, a reference voltage generator 22, a comparator 24, a warning device 26, and a manual switch 28. The speed sensor 10 is installed in a motor vehicle for continuously producing on an output terminal thereof a speed signal representing the speed of the motor vehicle. The output terminal of the speed sensor 10 is connected through a line 30 to an input terminal of the integrator 18 and through a line 32 to an input terminal of the reference voltage generator 22. The integrator 18 is designed to integrate the speed signal from the speed sensor 10 so that the speed signal is converted into a trip signal which represents the distance travelled by the motor vehicle. The reference voltage generator 22 is designed to continuously produce on an output terminal thereof a reference voltage the magnitude of which is varied proportionally with the speed signal from the speed sensor 10. The reference voltage may be controlled in such a manner that the magnitude of the reference voltage is proportional to that of the speed signal. The output terminals of the integrator 18 and the reference voltage generator 22 are respectively connected through lines 34 and 36 to a pair of input terminals of the comparator 24. The comparator 24 receives through the input terminals thereof the trip signal and the reference voltage and produces on an output terminal thereof a logic "1" signal when the magnitude of the trip signal exceeds the reference voltage. The output terminal of the comparator 24 is connected through a line 38 to an input terminal of the warning device 26. In response to the logic "1" signal from the comparator 24, the warning device 26 is energized to alert the driver. In this instance, the warning device 26 may be a type which can be activated for a given period of time on reception of the logic "1" signal from the comparator 26. A lamp, a buzzer, and devices for automatically switching on a radio or an electric fan, for vibrating a vehicle seat, and for opening a vehicle window may be utilized as the warning device 26. A manual switch 28 is connected through a line 40 to the other input terminal of the warning device 26 for manually switching off a power source provided in the warning device 26 when the warning action is no longer required by the driver. The steering wheel operation sensor 12 is so constructed as to produce on an output terminal thereof a steering wheel signal as long as the steering wheel varies. The steering wheel operation sensor 12 may be a type as described in U.S. Pat. No. 3,106,981 wherein an on-off light beam produced by interception of an apertured member provided on the steering wheel in response to the oscillatory movements thereof is converted into a pulse-type signal. The accelerator operation sensor 14 is constructed to produce on an output terminal thereof an accelerator operation signal when the depression of the accelerator pedal from the home or inoperative position varies. The output terminals of the operation sensors 12 and 14 are respectively connected through lines 42 and 44 to a pair of inputs of the OR gate 16 which can produce on the output terminal thereof a logic "1" signal when it receives at least one operation signal from the above-mentioned operation sensors 12 and 14. The output terminal of the OR gate 16 is connected through a line 46 to an input terminal of the reset circuit 20 which has an output terminal connected through a line 48 to the other input terminal of the integrator 18. When the reset circuit 20 receives the logic "1" signal from the OR gate 16, the reset circuit 20 produces a reset signal which is fed to the integrator 18 so that the integrator 18 is reset thereby to return to its initial state. The reset circuit 20 further has the other input terminal which is connected through a line 50 to the other output terminal of the manual switch 28. The reset circuit 20 also produces the reset signal in response to the operation of the manual switch 28.

With reference to the FIG. 2, there is illustrated a detailed circuit of the integrator 18 which comprises an operational amplifier 52 having a pair of input terminals, one of which is earthed or grounded. The operational amplifier 52 is provided with an output terminal connected to the line 34. A capacitor 54 has a pair of terminal respectively connected to the other input terminal and the output terminal of the operational amplifier 52. The other input terminal of the operational amplifier 52 is connected through a resistor 56 to the line 30. A relay 58 includes a normally open switch 60 bypassing the capacitor 54, and a coil 62 having an end earthed and the other end connected to the line 48. It is therefore to be appreciated that if the switch 60 is closed due to the energization of the coil 62, the charge stored in the capacitor 54 is discharged, so that the capacitor 54 is returned to its initial uncharged state.

The operation of the electronic driving assurance system as set forth above will now be described. During the normal operation of a vehicle equipped with the system of this invention, the steering wheel and the accelerator pedal are operated sufficiently, in keeping the vehicle aligned with the road, to produce on their outputs the steering wheel operation signal and the accelerator pedal operation signal. These operation signals are fed to the "OR" gate 16, thence to the reset circuit 20, which resets the integrator 18 as described above thereby to prevent the operation of the warning device 26.

If the driver in the vehicle becomes drowsy or is otherwise incapacitated, the operation signals from both of the steering operation sensor 12 and the accelerator operation sensor 14 cease due to the inoperative conditions of the operation sensors 12 and 14. This permits the integrator 18 to integrate the speed signal from the speed sensor 10 until a critical condition in which the magnitude of the integrated voltage or trip signal is larger than that of the instantaneous reference voltage appearing on the output of the reference voltage generator 22. When the above-mentioned critical condition occurs, the comparator 24 produces a logic "1" signal on the output terminal thereof thereby to energize the warning device 26 to alert the driver.

Although, in the foregoing description a speed sensor and a integrator are employed for producing a distance signal representing a trip distance travelled by the vehicle, a timer may be employed for such purpose to produce a signal at a preselected time interval.

It is to be appreciated that the steering wheel operation sensor described hereinbefore may be replaced by a type which can produce a logic "1" signal when the steering wheel is manually rotated beyond a predetermined angle from the neutral position thereof. The "neutral position" is defined in this instance as the position of the steering wheel whereby the vehicle traverses a substantially straight line.

It is to be noted that the invention is not to be limited to the configuration shown and described and that various changes and modifications may be made without departing from the spirit and scope of the invention, as defined in the appended claims.

What is claimed is:

1. A safety system for alerting a driver when said driver becomes drowsy while operating a motor vehicle, comprising a steering wheel operation sensor for producing a first signal when a steering wheel of said motor vehicle rotates through an angle larger than a predetermined angle; an accelerator operation sensor for producing a second signal when an accelerator pedal of said motor vehicle is displaced through a distance larger than a predetermined distance; signal generating means including a speed sensor for producing a third signal representing the speed of said motor vehicle, and an integrator for integrating said third signal into a voltage signal representing the distance travelled by said vehicle until it is reset, into its initial state, by at least one of said first and second signals; a reference voltage generator for producing a reference voltage, the magnitude of which is variable in accordance with said third signal; a comparator for producing a fourth signal when the magnitude of said voltage signal exceeds said reference voltage; and a warning device for giving a warning to said driver when it receives said fourth signal.

2. A safety system as claimed in claim 1, in which said signal generating means further comprises an OR gate for receiving said first and second signals; an operational amplifier having the input thereof connected to the output of said speed sensor and the output thereof connected to said comparator; a capacitor bypassing said operational amplifier; and a relay having a normally open switch bypassing said capacitor, and a coil connected to the output of said OR gate, said normally open switch closing its contacts to allow said capacitor to be discharged when said coil is energized by a signal issued from said OR gate.

3. A safety system according to claim 2, further comprising a manual switch for manually switching off a power source provided in said device and simultaneously resetting said integrator into its initial state when the warning action is no longer required by the driver.

* * * * *